(12) United States Patent
George et al.

(10) Patent No.: US 8,255,203 B2
(45) Date of Patent: Aug. 28, 2012

(54) METHOD OF DEBUGGING AN EXECUTABLE COMPUTER PROGRAM HAVING INSTRUCTIONS FOR DIFFERENT COMPUTER ARCHITECTURES

(75) Inventors: Jini Susan George, Karnataka (IN); Ranganath Ramachandra, Karnataka (IN); Shivarama Rao Kokrady, Karnataka (IN); Surya Kumari Jangala, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 12/109,269

(22) Filed: Apr. 24, 2008

(65) Prior Publication Data

US 2008/0270107 A1 Oct. 30, 2008

(30) Foreign Application Priority Data

Apr. 26, 2007 (IN) .............................. 895/CHE/2007

(51) Int. Cl.
*G06F 9/455* (2006.01)

(52) U.S. Cl. ......................................................... 703/28

(58) Field of Classification Search .................... 703/28; 717/134, 129
See application file for complete search history.

(56) References Cited

U.S. PATENT DOCUMENTS

| | | | | |
|---|---|---|---|---|
| 5,548,717 | A * | 8/1996 | Wooldridge et al. ......... | 717/124 |
| 6,145,123 | A * | 11/2000 | Torrey et al. .................. | 717/128 |
| 2002/0032718 | A1* | 3/2002 | Yates et al. .................... | 709/107 |
| 2003/0217277 | A1* | 11/2003 | Narayanan .................... | 713/187 |
| 2005/0071824 | A1 | 3/2005 | K. N. | |

OTHER PUBLICATIONS

Rosenberg, How Debuggers Work, 1996, Wiley Computer Publishing, pp. 99-101.*

* cited by examiner

*Primary Examiner* — Dwin M Craig
*Assistant Examiner* — Bernard E Cothran

(57) ABSTRACT

A method of debugging an executable computer application comprising instructions of a first computer architecture instruction set and instructions of a second computer architecture instruction set. The method comprises determining whether an instruction being debugged is from the second architecture instruction set; and obtaining debug information from an emulator of the second architecture in a first architecture environment when the instruction being executed is from the second architecture instruction set. The debug information results from emulation of the instruction being debugged.

20 Claims, 3 Drawing Sheets

METHOD OF DEBUGGING AN EXECUTABLE COMPUTER PROGRAM HAVING INSTRUCTIONS FOR DIFFERENT COMPUTER ARCHITECTURES

RELATED APPLICATIONS

This patent application claims priority to Indian patent application serial no. 895/CHE/2007, having title "A Method of Debugging an Executable Computer Program Having Instructions for Different Computer Architectures", filed on 26 Apr. 2007 in India, commonly assigned herewith, and hereby incorporated by reference.

BACKGROUND

When first developed a computer program often contains defects, commonly termed bugs. Software developers attempt to remove bugs in their computer programs prior to a commercial release. However, some bugs are difficult to find, and are not found and corrected for some time. To assist in debugging software, a software debugging tool—commonly called a debugger—is used. The debugger is useful to track the progress of execution of instructions and to see the effects of each instruction on registers, the stack and memory. Debugging tools often allow the user to control the execution process in a step by step (instruction by instruction) manner.

Also when a computer program encounters a serious error—often termed a crash—a core dump of the instruction queue, registers and the stack can be performed for debugging purposes.

Typically computer programs are compiled to run on a particular computer architecture by use of an instruction set for the particular architecture. Common computer architectures are Hewlett-Packard's PA-RISC, Intel's IA-64 and x86, and the Apple, IBM and Motorola Alliance's PowerPC.

However a computer program can be formed from a first group of instructions of a first architecture instruction set and a second group of instructions of a second architecture instruction set, where the second group of instructions are emulated by use of an emulator. Such computer programs are termed mixed mode applications. Current debuggers are not intended to debug mixed mode applications. Since the second group of instructions are not for the same architecture current debuggers may not understand or may misinterpret the second group of instructions.

This creates problems when it is desired to debug a mixed mode application.

DESCRIPTION OF THE DRAWINGS

In order to provide a better understanding of the present invention, embodiments of the present invention will now be described, by way of example only, with reference to the accompanying drawings, in which.

DESCRIPTION OF EMBODIMENTS OF THE PRESENT INVENTION

Figure 1:
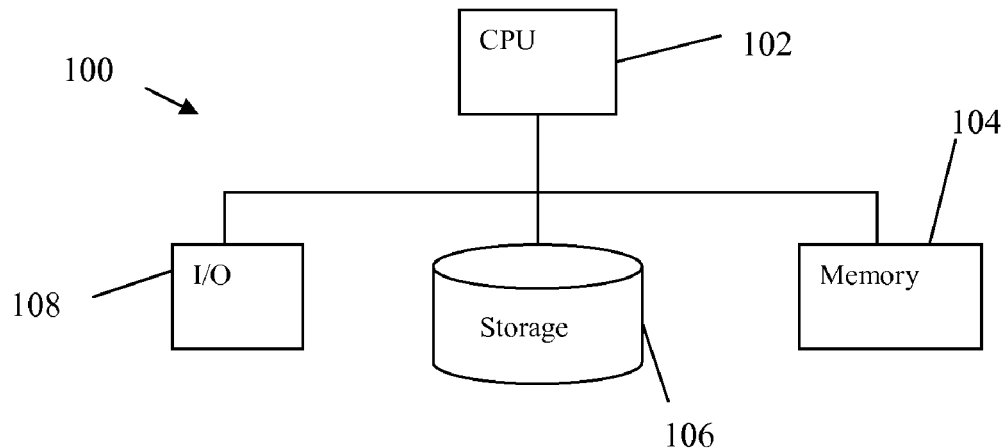
FIG. 1 is a block diagram of a computer system according to an embodiment of the present invention.

Referring to FIG. 1, there is shown an embodiment of a computer system 100 comprising a microprocessor 102 connected to memory 104 and a mass storage device 106. In this embodiment the memory 104 is random access memory and the mass storage device 106 is a hard disk drive. The microprocessor 102 is also connected to one or more input/output devices 108. The input/output devices 108 include, for example, a video adaptor, display, sound adaptor, and human input devices such as a mouse and keyboard. The microprocessor 102 is one of a family of processors available for a particular architecture. For example the microprocessor may be one of the Itanium2™ processors which use the IA-64 architecture, a PA-8900 which uses the PA-RISC architecture, or one of the Pentium 4™ processors which use x86 architecture.

Figure 2:
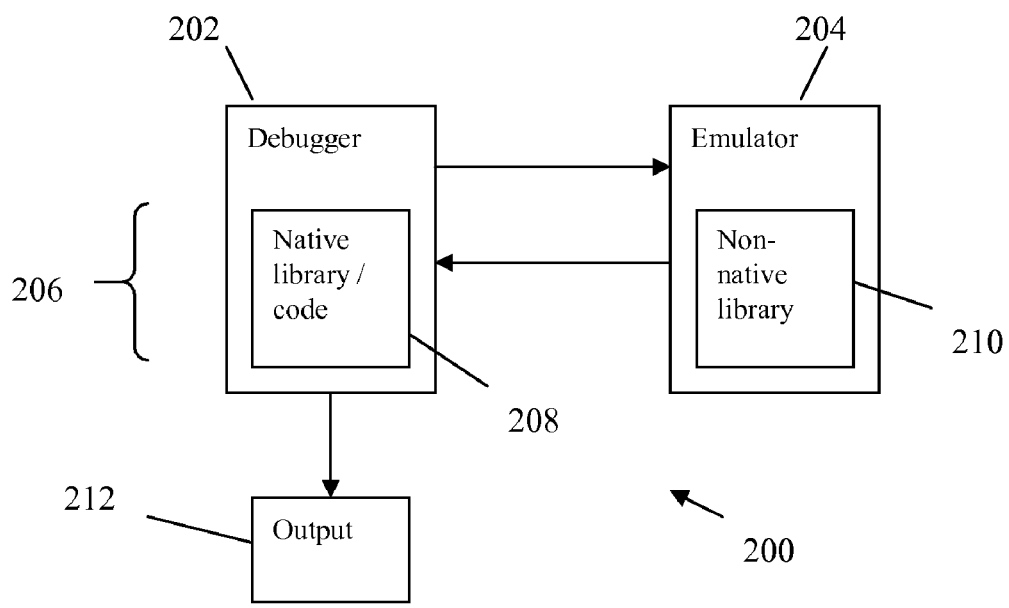
FIG. 2 is a schematic block diagram of an embodiment of a debugging tool set for debugging a mixed mode application according to the present invention.

Referring to FIG. 2, there is shown a debugging tool set 200 installed on the computer system 100. These applications are loaded from a computer readable medium (such as a CDROM, DVD or flash memory) onto the mass storage device and loaded into the memory 104 for execution by the microprocessor 102 when started.

The debugging tool set 200 comprise a debugger 202 and an emulator 204. The debugging tool set 200 is arranged to debug a computer program 206 that includes instructions for a first architecture (that is, native instructions 208) and one or more libraries or modules for a second architecture (that is, non-native libraries 210). Native instructions comprise instructions of the instruction set of the architecture on which the computer program is intended to run. Non-native libraries comprise instructions which belong to an instruction set of a different architecture. Computer programs that comprise instructions of different architecture instruction sets are termed 'mixed-mode' applications.

The debugger 202 produces an output 212. In this embodiment the output 212 is in the form of information displayed to the user on the display of the input/output devices 108. The output 212 is useful to assist in finding a bug in the program 206. In the embodiment described herein, the debugger 202 is 'adb' (a HP-UX debugger), which runs on the Itanium Processor Family architecture (IA-64). However it will be appreciated that other debuggers can be used in other embodiments of the invention. It will be appreciated that the debugger may be for other architectures. In this embodiment the native code comprises instructions from the IA-64 instruction set, but it will be appreciated that code for other instruction sets can be used when the microprocessor 102 is of another architectural type. In this embodiment the non-native libraries are HP-PA RISC (Hewlett-Packard Precision Architecture Reduced Instruction Set Computing) libraries. It will be appreciated that other non-native libraries from other architectures can be used instead. In this embodiment the emulator 204 is Aries which emulates the PA RISC libraries on the IA-64 architecture. It will be appreciated that other emulators can be used, as is appropriate, to emulate the desired second architecture instruction set on a computer system of the first architectural type.

Mixed mode applications are executed by a dynamic loader loading an emulator (as a) library on encountering a non-native library. Control is transferred to the emulator library 204 and the emulator library 204 takes care of emulating the instructions of the non-native library 210 on the native platform.

There are two main types of debugging; core dump debugging and live debugging.

In core dump debugging, the execution stack trace of an application is saved in a core dump file. The core dump file comprises crash context information, such as the current instruction pointer value, register values, the contents of the stack at the time of the crash and a memory image. This file is loaded into the debugger 202, which can be used to find the module that caused the crash and, in particular, the instructions of interest based on the value of the instruction pointer. The user may encounter frames within the core dump file that comprise both native and non-native functions. To overcome this, the debugger 202 is able to determine whether each instruction of interest is a native instruction or emulation of a non-native instruction. The debugger 202 can do this by analysing the addresses of instructions contained in the execution stack trace, to determine if the addresses represent instructions from the first architecture or not. Where it is determined that the instructions are non-native, they are loaded into the emulator library 204 in order to read debug information in the form of emulated frames from a data area of the emulator library 204, by dynamically loading the emulator library 204 in the debugger context and making appropriate API calls to retrieve the stack frames. The emulated frames comprise data representing the procedures that are emulated by the emulator library 204. They are similar to normal stack frames, but will be placed in the emulator data area. They are created by the emulator library 204 as and when new procedures are called. The debugger 202 dynamically loads a helper library for the emulator library 204 and requests it provide details (like values of registers and values of the memory contents) of the stack frame, which the debugger 202 uses to display the stack trace. In this embodiment, debug information is information about the various events taking place in the emulated instructions of the non-native library 210.

In live debugging, there is again the problem that the mixed mode application comprise both native and non-native functions. It is determined whether the instruction currently being executed is a native instruction or an emulation of the non-native instruction. When the instruction is an emulation of a non-native instruction, debug information is obtained from the emulator library 204 and provided to the debugger 202.

When debugging, it is sometimes desired to undertake a single step (instruction by instruction) analysis of the application 206, and it is also sometimes desired to set a breakpoint in the application and to let the application run until it reaches the breakpoint.

In single stepping mode, the user can single step through the emulated instructions of the non-native library 210. So as to not have the debugger single step through the emulator library instructions, the debugger 202 controls the emulator library 204 so as to stop emulation at the end of each emulated instruction and provide debug information to the debugger 202 as desired. The debugger 202 can then, in effect, single step through the emulated instructions.

In this embodiment the emulation is controlled by use of the ttrace( ) mechanism provided by the operating system kernel. In this embodiment ttrace( ) is a system call of HP-UX, a Hewlett-Packet implementation of the UNIX operating system. Similar mechanisms can be used in other operating systems, such as ptrace in the Linux operating system.

The ttrace( ) system call allows the debugger 202 to control the execution of the emulator library 204 to implement a breakpoint and event driven debugging. The traced process (the emulator library 204) behaves normally until one of its threads encounters a signal, or an event at which point the thread enters a stopped state and the tracing process is notified via a ttrace_wait( ).

Figure 3:
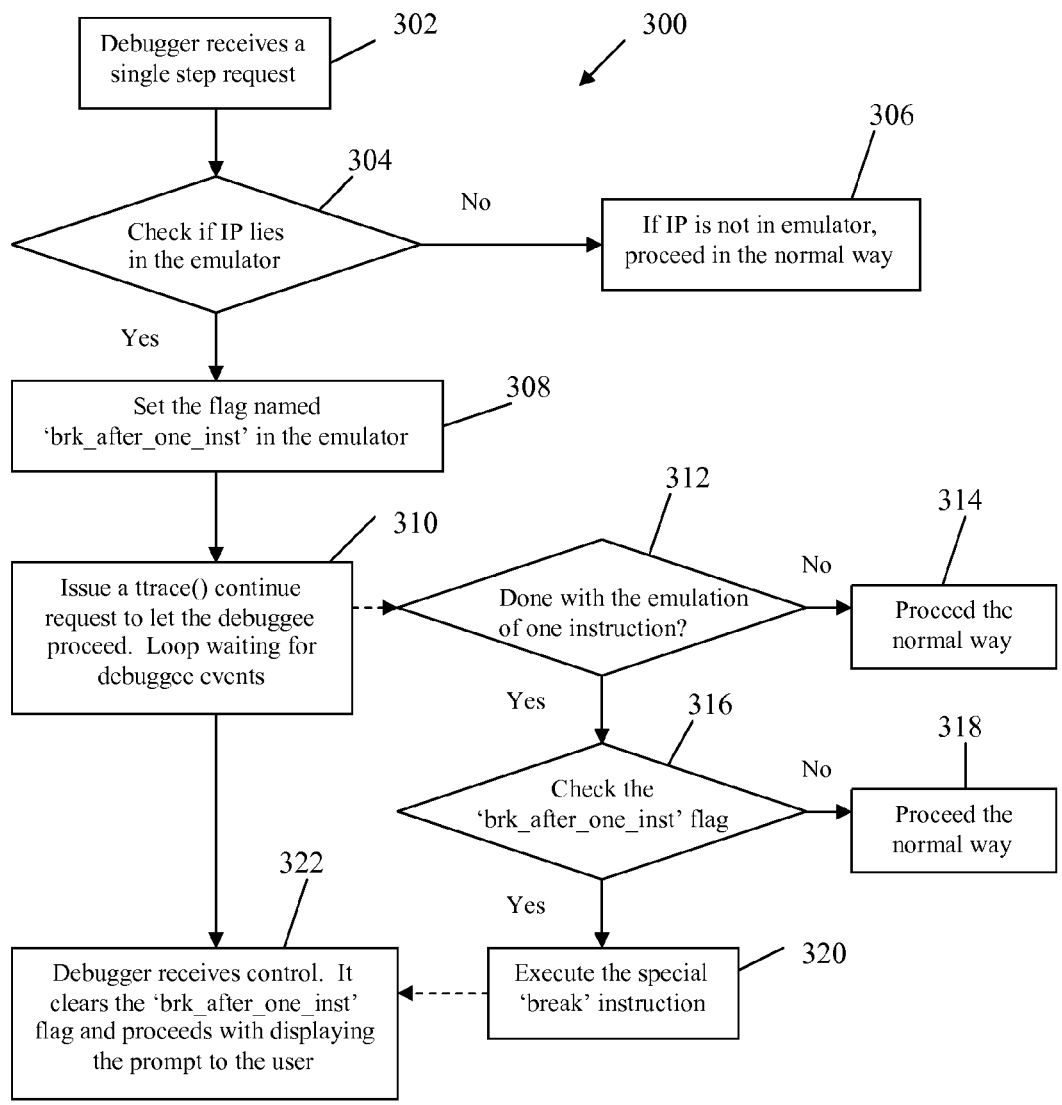
FIG. 3 is a flow chart showing an embodiment of a process to single step through instructions of a debuggee application according to the present invention.

Referring to FIG. 3, a method 300 of single stepping is shown. The debugger 202 receives 302 a single step request from the user and enters a single step mode. The debugger 202 checks 304 the Instruction Pointer (IP) to determine whether the current instruction (for which the single step is to be undertaken) is from the native instructions 208 or the emulated non-native instructions 210. If the IP is not in the emulator library 204 (that is the instruction is in the native instructions 208) the debugger 202 proceeds 306 in the normal way to single step the native instruction. In architectures that have a program counter, this is used instead of the instruction pointer.

If the IP is in the emulator library 204, the current instruction is a non-native instruction to be emulated. The debugger 202 signals to the emulator library 204 that it has to stop emulation after emulating a single instruction and then communicate to the debugger 202 so that the debugger 202 can stop and display information to the user. To do this, the debugger 202 sets 308 a flag in the emulator library 204 named "brk_after_one_inst". The debugger 202 does this by issuing a ttrace( ) system call to write into the data area of the emulator library 204. The debugger 202 then lets the emulator library 204 proceed by issuing 310 a ttrace( ) continue request. The debugger 202 loops waiting for a debugger event.

The emulator library 204 checks 312 if it has completed emulation of each non-native instruction. If it hasn't 314 it proceeds in the normal way. After the emulation of each instruction, the emulator library 204 checks 316 the "brk_after_one_inst" flag to determine if it should stop. If the "brk_after_one_inst" flag is not set, the emulator library 204 proceeds 318 in the normal way. If the flag is set, then the emulator library 204 executes 320 a special break instruction; that is, a 'break' instruction with a special immediate value. Execution of a break instruction is a mechanism used in debugging scenarios to suspend execution of the application and to give control to the debugger 202. The special immediate value helps to identify that the execution has stopped due to a single step execution.

The debugger 202 exits its loop, receives 322 control from the emulator library 204, clears the "brk_after_one_inst" flag and displays a user prompt.

At any point in time, the user might want to stop the execution of the debugged program 206 to examine the context of the application. In this embodiment the context is debug information output to the user. This context comprises attributes of the program like registers, memory, stack, etc. If the execution is stopped while the non-native library 210 is being executed, then the stoppage might be done in the midst of emulating a non-native instruction. This would mean that the emulator library 204 might not be finished with the instruction emulation and the emulator library 204 might not have updated all the data structures representing the different attributes of the program context. This would cause the debugger 202 to read incorrect information when it reads in the context.

Figure 4:
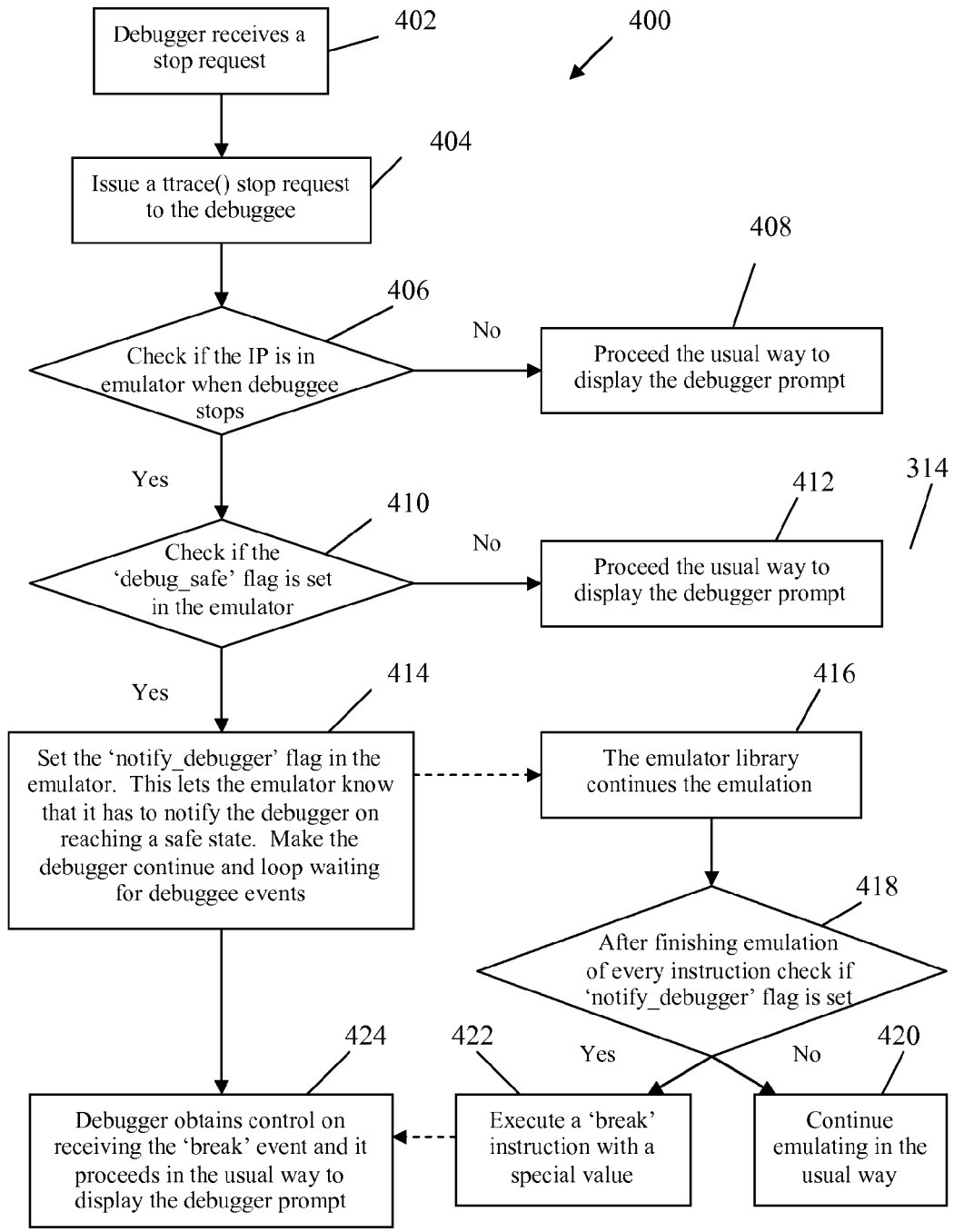
FIG. 4 is a flow chart showing an embodiment of a process to safely stop execution of an emulated instruction for debugging according to the present invention.

To ensure that the emulation is stopped in a safe state the emulator library 204 signals to the debugger 202 that it is safe to stop the emulator library 204. The emulator library 204 has a global symbol flag "debug_safe". The debugger 202 reads this flag to determine if the emulation is in a safe state to be stopped. The "debug_safe" flag is turned on/off by the emulator library 204 depending on whether the emulator library 204 is in the midst of emulating a non-native instruction or not. This process 400 is described in more detail in relation to FIG. 4.

When the debugger receives 402 a stop request, the debugger issues 404 a ttrace( ) stop request to the emulator library 204. The debugger 202 checks 406 the IP to determine whether it is in the emulator library 204. If it is not in the emulator library 204, it proceeds 408 in the usual way. If it is in the emulator library 204, the debugger 202 uses the ttrace( ) mechanism to read in the value of the "debug_safe" flag and check 410 whether the flag is set. If the "debug_safe" flag is set, the debugger proceeds 412 with its normal execution path of stopping the application and displaying the prompt to the user.

If the flag is turned off, the debugger 202 turns on a flag called "notify_debugger" in the emulator library 204 and lets the emulation continue 414 (again using the ttrace( ) mechanism). The debugger 202 will loop waiting for a debuggee event.

The emulator library 204 continues 416. After finishing emulation of each instruction it will turn on the "debug_safe" flag and will check the "notify_debugger" flag 418. If the "notify_debugger" flag is not set, then it will continue in the normal way 420. If the "notify_debugger" flag is set, the emulator library 204 will let the debugger 202 know that is has finished emulation of the current instruction. This is again done by executing 422 a special breakpoint which returns control to the debugger 202.

On receiving control, the debugger 202 proceeds 424 with its normal execution path of stopping the application and displaying the prompt to the user.

The debugger 202 may receive events from execution of the native module 208, execution of the emulator library 204 or execution of the non-native library 210. The debugger 202 differentiates between these events. The user of the debugger 202 may not be made aware of the events that arise due to execution of the emulator instructions. In this embodiment, where the emulator library 204 is Aries, the SIGSEGV signal can be used to check whether a stack overflow happens or not and to grow the stack subsequently. For these kinds of signals, the debugger 202 may not let the user know that such a signal has arrived. The signal is passed onto the emulator library 204 for further processing, such as for emulation of the event in the second architecture.

It can be beneficial to differentiate between breakpoint events that occur:
(a) when the emulator library 204 emulates a break instruction on behalf of the mixed mode process;
(b) when the emulator library 204 executes a break instruction to signal the end of a single step emulation; and
(c) when the emulator library 204 executes a break instruction to signal that it has reached a safe state in the midst of emulation.

The immediate values in the break instruction are used by the debugger 202 to differentiate between these different scenarios. The immediate value can also be used to distinguish whether the breakpoint event is from the emulator library 204 (in which case the user may not be informed) or the non-native load module. While placing a breakpoint in the non-native library 210, the debugger 202 uses a breakpoint instruction corresponding to the architecture of the non-native library 210. This is done so that the emulator library 204 understands this breakpoint instruction and emulates that too.

In an embodiment, the emulator library 204 has handlers installed to check if the signal has risen due to the execution of emulator instructions. For the debugger 202 to get to this information, it calls these handlers in the context of the debugged application. (Debuggers generally have the capability of executing a function in the context of the application being debugged). Execution of this function helps the debugger 202 determine if the user is to be notified of this signal or not.

The register set available in the native architecture is likely to be quite different from that of the architecture of the non-native library 210 being emulated. When execution is stopped in the non-native library 210, the user would expect to read from/write into the non-native architecture registers. In an embodiment, the emulator library 204 preserves the state of the application it emulates by storing a representation of the non-native registers in its own data area. Based on the IP value obtained, the debugger 202 can determine if the execution is stopped in the emulator instructions or instructions of the native module 208. If the execution has stopped in the emulator instructions, then the debugger 202 requests from the emulator library 204 a mapping that maps the registers to the data addresses within the emulator library 204. This can be done by dynamically loading the emulator library 204 in the debugger context and making the request. On obtaining the relevant data addresses, the debugger 202 issues a ttrace( ) read/write request with the obtained memory as the argument to read from/write into the actual register values. This information is then displayed to the user as part of output 212.

The present invention allows debugging of the non-native modules in a mixed mode application.

It will be understood to persons skilled in the art of the invention that many modifications may be made without departing from the spirit and scope of the invention.

The invention claimed is:

1. A method of debugging an executable computer application comprising instructions of a first computer architecture instruction set and instructions of a second computer architecture instruction set, the method comprising:
   determining whether an instruction being debugged is from the second computer architecture instruction set;
   obtaining debug information from an emulator of a second architecture instruction set in a first architecture environment when the instruction being debugged is from the second computer architecture instruction set, wherein the debug information results from emulation of the instruction being debugged, wherein obtaining the debug information from the emulator comprises:
      signaling to the emulator to stop emulation by a debugger;
      making a determination, by the debugger, that the emulator is in the midst of emulating the instruction, in response to the debugger signaling to the emulator to stop emulating;
      in response to determining the emulator is in the midst of emulating the instruction, the debugger signaling to the emulator that it should notify the debugger when it has finished emulating the instruction by setting a flag in the emulator; and
      the emulator completing emulating the instruction and notifying to the debugger that it is safe to stop the emulation; and
   running the debugger in the first architecture environment using the obtained debug information.

2. The method of claim 1, wherein the emulator is controlled by the debugger in such a way that the emulator is stoppable when an event occurs and the debugger is notified of the stop.

3. The method of claim 1, wherein the instruction being debugged is obtained from a core dump.

4. The method of claim 3, wherein the core dump comprises instructions that are from the second computer architecture instruction set, the instructions from the second computer architecture instruction set are loaded into the emulator.

5. The method of claim 4, wherein the debugger reads emulated debug information from a data area of the emulator.

6. The method of claim 1, wherein the debugger is arranged to control the emulator to single step through the emulated instructions of a non-native library.

7. The method of claim 1, wherein the debugger signals to the emulator to stop emulation after emulating a single instruction.

8. The method of claim 7, wherein the debugger signals to the emulator to stop emulation after each instruction by setting a flag of the emulator.

9. The method of claim 1, wherein a breakpoint is set to stop execution of the computer application at the instruction being debugged.

10. The method of claim 9, wherein the emulator finishes emulating the instruction before stopping if the instruction being debugged is from the second computer architecture instruction set.

11. The method of claim 10, wherein the emulator signals to the debugger that it is safe to stop the emulator when it has finished emulating the instruction.

12. The method of claim 10, wherein the debugger signals to the emulator that it should notify the debugger when it has finished emulating the instruction.

13. The method of claim 1, wherein the debugger is arranged to differentiate events that arise from execution of the emulator from events that arise from the computer program, so as to signal that an event has occurred in the execution of the computer program.

14. The method of claim 1, wherein the emulator stores a representation of an emulated register set in a data area, wherein the debugger is arranged to read from and write to the register set in the data area.

15. The method of claim 1, wherein the debugger determines whether the instruction being debugged is from the second computer architecture instruction set according to the value of an instruction pointer.

16. The method of claim 1, wherein if not, stopping the emulation and displaying the debug information.

17. A debugger for debugging an executable computer application comprising instructions of a first computer architecture instruction set and instructions of a second computer architecture instruction set, the debugger comprising:
   a detector for determining whether an instruction being debugged is from the second computer architecture instruction set; and
   a reader for obtaining debug information from an emulator of the second architecture instruction set in a first architecture environment when the instruction being debugged is from the second computer architecture instruction set, wherein the debug information results from emulation of the instruction being debugged, wherein the debugger signals the emulator to stop emulation and determines that the emulator is in the midst of emulating the instruction in response to the signal from the debugger to the emulator to stop emulation, wherein the debugger signals to the emulator that it should notify the debugger when it has finished emulating the instruction by setting a flag in the emulator when emulator is in the midst of emulating the instruction, and wherein the emulator completes emulating the instruction and notifies to the debugger that it is safe to stop the emulation.

18. An emulator configured for debugging an executable computer application comprising instructions of a first computer architecture instruction set and instructions of a second computer architecture instruction set, the emulator comprising:
   an interface to a debugger that can determine whether an instruction being debugged is from the second computer architecture instruction set according to the value of an instruction pointer, wherein the interface receives from the debugger instructions of the computer program that are from the second computer architecture instruction set; and
   an emulation module for emulating the instructions that are from the second computer architecture instruction set in a first architecture environment and producing debug information from the emulation, wherein the debugger signals the emulator to stop emulation and determines that the emulator is in the midst of emulating the instruction in response to the signal from the debugger to the emulator to stop emulation, wherein the debugger signals to the emulator that it should notify the debugger when it has finished emulating the instruction by setting a flag in the emulator when emulator is in the midst of emulating the instruction, and wherein the emulator completes emulating the instruction and notifies to the debugger that it is safe to stop the emulation.

19. A debugging tool set for debugging an executable computer application comprising instructions of a first computer architecture instruction set and instructions of a second computer architecture instruction set, the tool set comprising:
   a debugger for determining whether an instruction being debugged is from the second computer architecture instruction set according to the value of an instruction pointer; and
   an emulator for emulating the instruction from the second computer architecture instruction set in a first architecture environment and producing debug information from the emulation, wherein the debugger signals the emulator to stop emulation and determines that the emulator is in the midst of emulating the instruction in response to the signal from the debugger to the emulator to stop emulation, wherein the debugger signals to the emulator that it should notify the debugger when it has finished emulating the instruction by setting a flag in the emulator when emulator is in the midst of emulating the instruction, and wherein the emulator completes emulating the instruction and notifies to the debugger that it is safe to stop the emulation.

20. A debugging computer program embodied on a non-transitory computer readable storage medium for debugging a target executable computer application comprising instructions of a first computer architecture instruction set and instructions of a second computer architecture instruction set, said debugging computer program comprising instructions for causing a computer processor to:
   determine whether an instruction being debugged is from the second computer architecture instruction set;
   obtain debug information from an emulator of the second architecture instruction set in a first architecture environment when the instruction being debugged is from the second computer architecture instruction set, wherein the debug information results from emulation of the instruction being debugged, wherein obtaining the debug information from the emulator comprises:
   signaling to the emulator to stop emulation by a debugger;

making a determination, by the debugger, that the emulator is in the midst of emulating the instruction, in response to the debugger signaling to the emulator to stop emulation;

signaling to the emulator, by the debugger, that it should notify the debugger when it has finished emulating the instruction by setting a flag in the emulator when the emulator is in the midst of emulating the instruction; and completing emulating the instruction and notifying to the debugger that it is safe to stop the emulation by the emulator; and running the debugger in the first architecture environment using the obtained debug information.

* * * * *